United States Patent
Geis et al.

[11] 3,937,339
[45] Feb. 10, 1976

[54] VEHICLE HAVING TRANSVERSE LEVELING MEANS

[75] Inventors: Warren P. Geis; Reinald D. Liegel, both of Port Washington, Wis.

[73] Assignee: Koehring Company, Milwaukee, Wis.

[22] Filed: Nov. 5, 1973

[21] Appl. No.: 412,916

Related U.S. Application Data

[63] Continuation of Ser. No. 193,807, Oct. 29, 1971.

[52] U.S. Cl. .............................. 214/140; 214/141
[51] Int. Cl.[2] ........................................... E02F 3/36
[58] Field of Search ............ 214/140, 141; 280/6 H, 280/6.1:6.11

[56] References Cited
UNITED STATES PATENTS

| | | | |
|---|---|---|---|
| 2,359,961 | 10/1944 | Anthony | 280/6 H |
| 3,154,320 | 10/1964 | D'Avigdor | 280/6.1 |
| 3,178,046 | 4/1965 | Lull | 214/141 |
| 3,233,909 | 2/1966 | Boone | 280/6 |
| 3,236,535 | 2/1966 | Barber | 280/6.1 |

*Primary Examiner*—Robert J. Spar
*Assistant Examiner*—Ross Weaver

[57] ABSTRACT

An end loader or forklift vehicles adapted to traverse uneven terrain and work surfaces and to vertically position a load, the vehicle including an automatic leveling device for maintaining the load and vehicle body transversely level regardless of uneven terrain. The leveling device includes means for operation in two separate angular sensitivity ranges, one adapted to automatically level the load and vehicle body during travel of the vehicle over uneven terrain, and the other range adapted to likewise level during stationary operation of the vehicle. To achieve this function the vehicle is provided with motor means for vertically positioning the vehicle axle and wheel assemblies relative to the vehicle body. The motor means is responsive to signals from the automatic leveling device including mercury switch means to accomplish vehicle body leveling.

22 Claims, 8 Drawing Figures

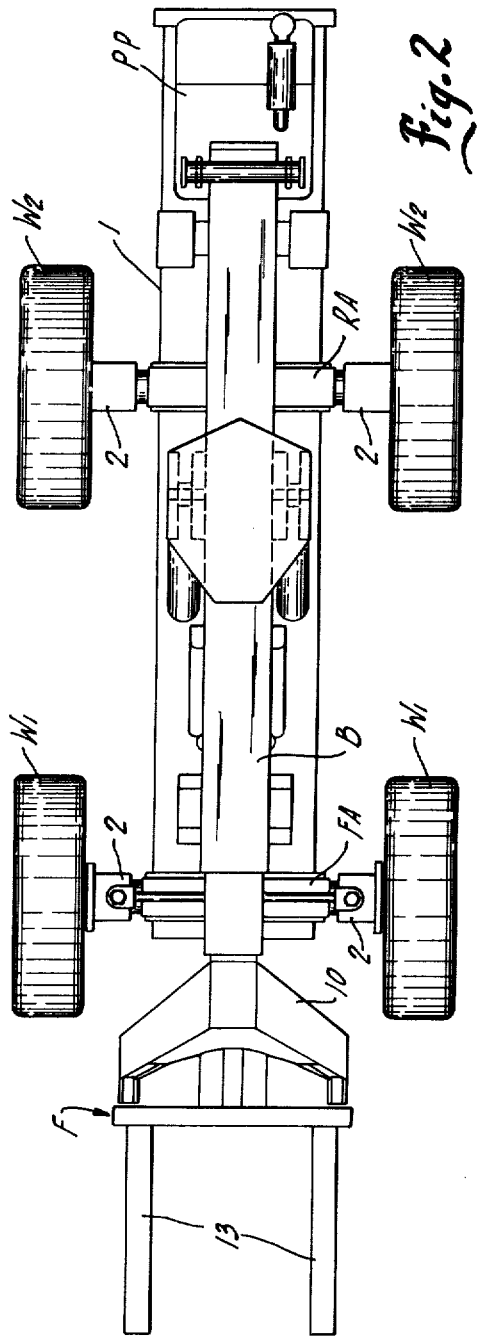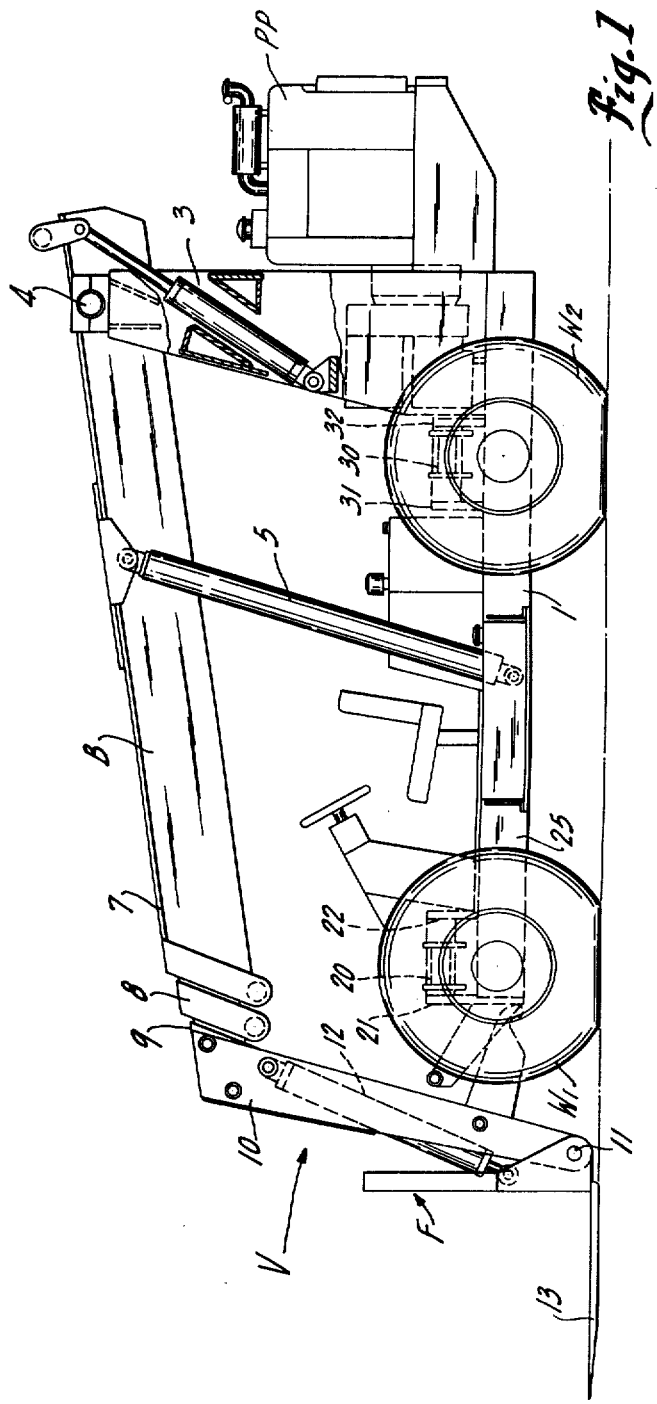

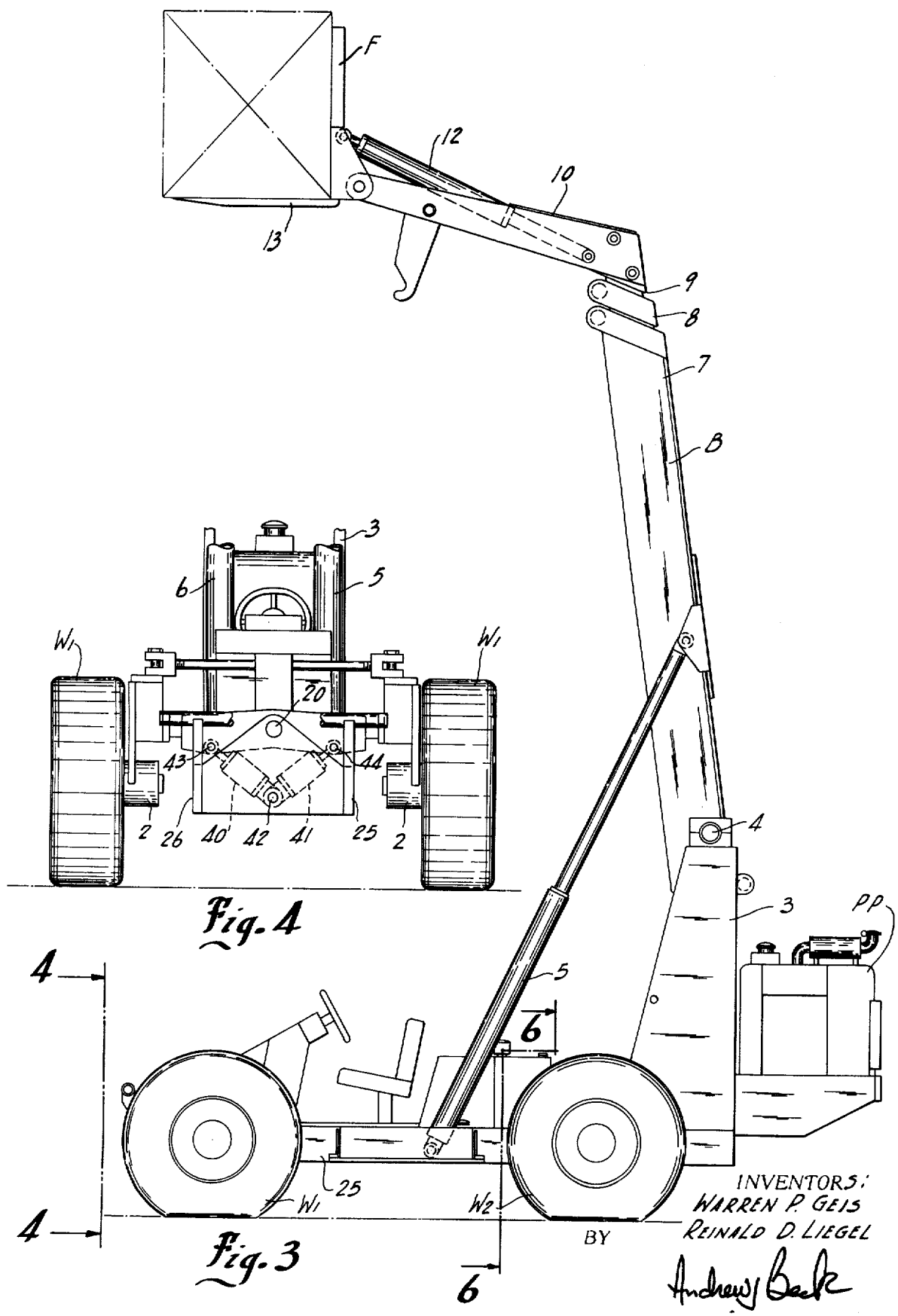

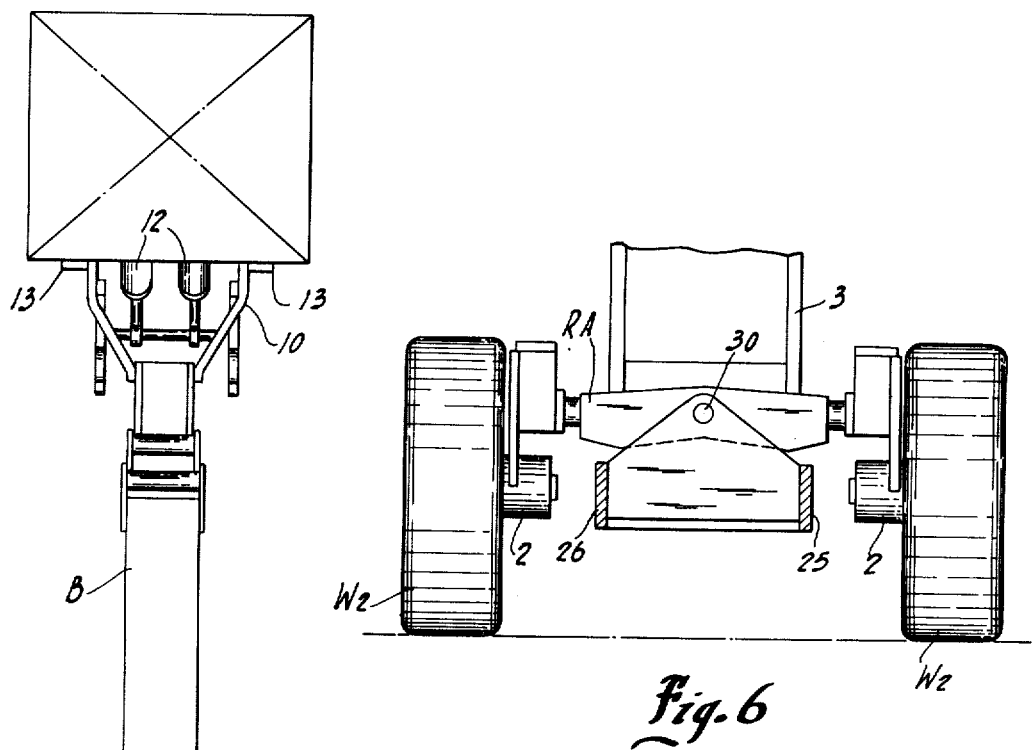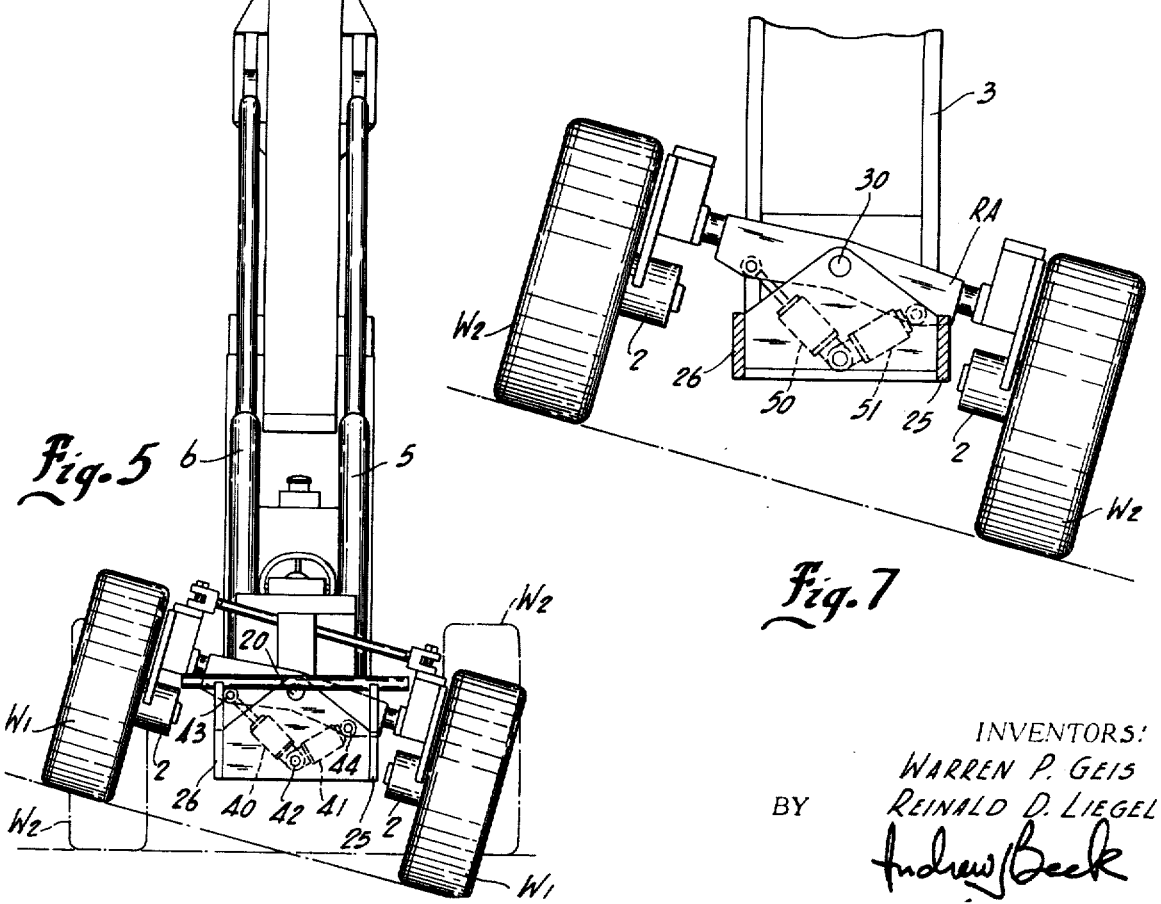

VEHICLE HAVING TRANSVERSE LEVELING MEANS

This is a continuation of application Ser. No. 193,807, filed Oct. 29, 1971.

BACKGROUND OF THE INVENTION

The invention relates to self-propelled high ground clearance vehicles, such as end loaders or fork lift trucks, adapted for elevating loads on construction sites or work areas having uneven surfaces.

End loader vehicles, such as fork lifts are faced with unusual and extremely difficult operational problems and design criteria. Fork lift vehicles have extreme stability problems because of their high boom, especially when heavy loads are being transported. These problems are even more troublesome when fork lifts are operated on construction sites which have uneven terrain and are littered with debris. Of necessity, many fork lift vehicles are provided with a high ground clearance design which involves maintaining as much of the vehicle as possible elevated from the terrain, especially those elements which extend across the width of the vehicle, such as the axles. While high ground clearance facilitates maneuverability of fork lifts on debris littered terrain, it compounds the stability problem because of the elevated center of gravity which, of necessity, accompanies high ground clearance. The stability problem is particularly acute when fork lifts are required to elevate substantial loads to considerable heights and move about on uneven terrain while balancing the load.

Heretofore in utilizing fork lift trucks on or over uneven terrain or work surfaces, load spilling and vehicle stability have sometimes been major operational problems. Various attempts have been made to stabilize fork trucks and like vehicles in such situations. However, these stabilizing devices have not been satisfactory during maneuvering of the vehicle and load over uneven surfaces. In this regard, such devices are generally usable only in stationary lifting situations and are dependent upon operator skill in manipulation to transversely level the load and/or vehicle. As a consequence, these and other such devices have not been completely satisfactory in assuring load and vehicle stability on and over uneven work surfaces.

SUMMARY OF THE INVENTION

The general object of the present invention is to provide an automatic leveling device for an end loader vehicle which minimizes or circumvents the problems heretofore noted. More specifically, it is a high ground clearance object of the instant invention to provide a high ground clearance end loader vehicle wherein the vehicle body and load are maintained transversely level during stationary operation or mobile maneuvering of the vehicle.

In achieving these and other objects, as will become apparent hereinafter, one embodiment of the present invention provides a selfpropelled loading vehicle having means for elevating a load, ground engaging wheel and axle assembly adapted to vertically shift the vehicle body, power cylinders pivotally connected to the vehicle body and axle, and an automatic leveling system for detecting the attitude of the vehicle and for actuating the power cylinders for maintaining the vehicle and its load transversely level. The automatic leveling system is adapted to provide two transversely angular ranges of operation, the first range being constantly used for ensuring that the load is level while it is being positioned. The second range of the leveling system is selectively operable by the operator for assuring that the vehicle body and load are maintained transversely level while the vehicle is traveling over undulating ground.

BRIEF DESCRIPTION OF THE DRAWINGS

FIG. 1 is a side elevational view of an end loader vehicle embodying the present invention;

FIG. 2 is a plan view of the vehicle shown in FIG. 1;

FIG. 3 is a side elevational view of the vehicle, similar to FIG. 1, but with the load elevated;

FIG. 4 is a front end elevational view of the loader, the view being taken along the line 4—4 in FIG. 3;

FIG. 5 is a front end elevational view of the loader shown in FIG. 3, but with the front axle being tilted when the front wheels are on unlevel ground;

FIG. 6 is a transverse, cross sectional view showing the rear axle assembly, the view being taken generally along the line 6—6 in FIG. 3;

FIG. 7 is a view similar to FIG. 6, but showing a modification of the invention wherein fluid cylinders are used to also change the angle of the rear axle assembly relative to the vehicle body;

DESCRIPTION OF A PREFERRED EMBODIMENT

Figure 8:
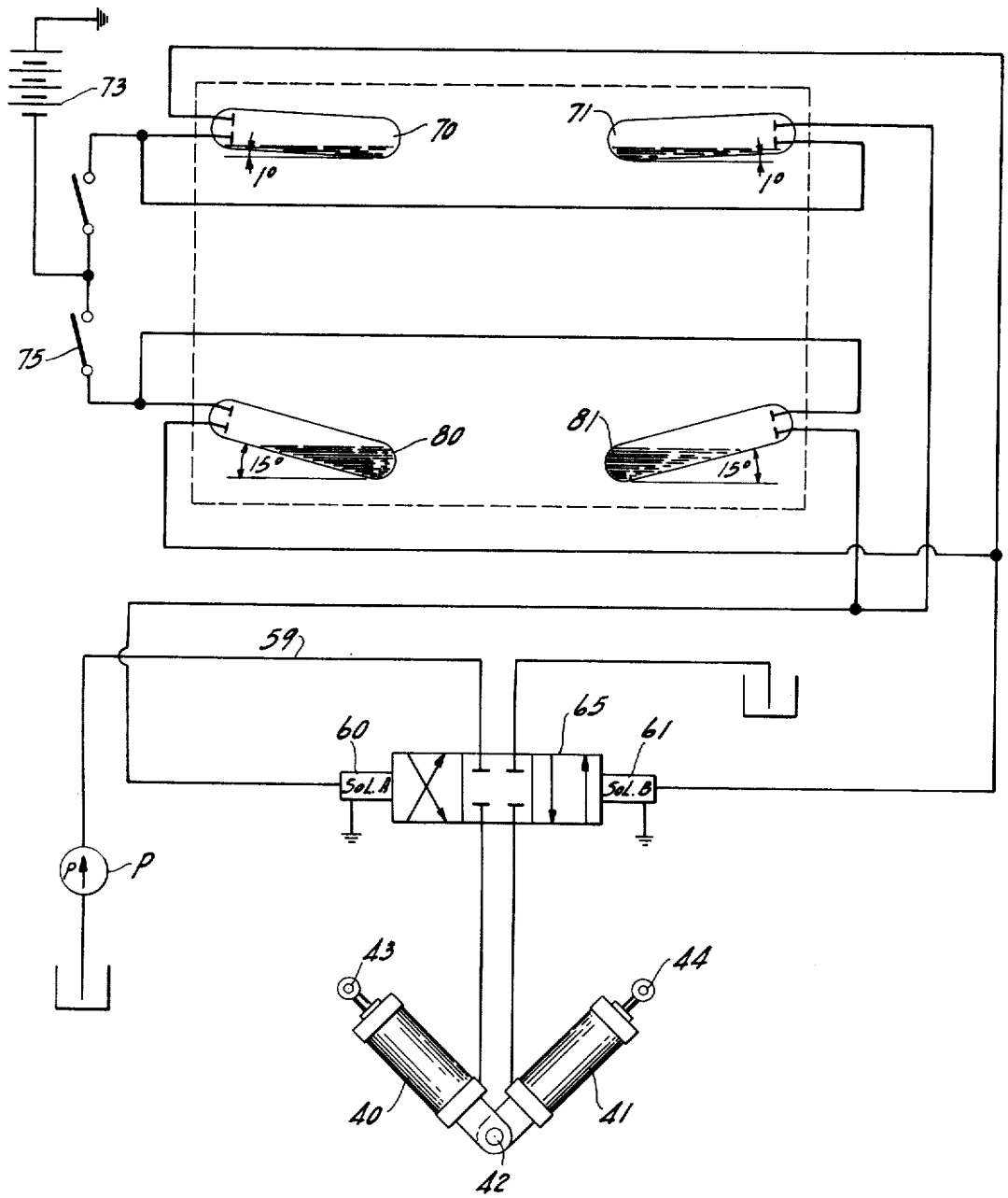
FIG. 8 is an electrical and fluid circuit diagram showing the automatic leveling system used with the present invention.

The vehicle chosen for purposes of illustrating the present invention is a self-propelled vehicle V having a body 1 on which is mounted an internal combustion plant PP that furnishes power via the individual wheel hydraulic motors 2 to the ground engaging wheels W1 and W2 in the known manner. The vehicle body also includes a rear upright frame 3 to which is pivoted the telescoping boom B, as at 4. The boom is movable in a vertical plane by means of a pair of large fluid cylinder units 5 and 6, one located at each side of the body.

The boom is shown as being of the type having three telescoping sections 7, 8 and 9 which are extensible and contractable by means of double acting fluid cylinder units (not shown) located within the boom. The outermost section 9 of the boom has a generally downwardly extending frame 10 rigidly fixed thereto. A load carrying, L-shaped fork F is pivotally mounted by a transverse axis 11 to the free end of the frame 10 and is angularly adjusted relative thereto by the double acting fluid cylinder unit 12. In this manner, the individual forks 13 of the fork F can be maintained in a level, fore and aft position, that is in a longitudinal direction, by actuation of the cylinder unit 12, in the known manner.

Cylinders 5 and 6 are also actuated by the operator as are the said cylinders units (not shown) located within the boom for extending the boom and in this manner, the boom can be swung from the position shown in FIG. 1 to an upright position shown in FIG. 3, and any position therebetween. Furthermore, the boom can be extended considerably and thereby the operator is capable of placing the load a considerable distance ahead of the vehicle as well as above it. When the load is so extended however, the vehicle may be unstable, particularly if it is located or traveling over undulating terrain.

It has heretofore been a difficult task for the operator to maintain the load level under all operating conditions, that is when the vehicle was traveling over the terrain as well as when the vehicle was stationary and the boom was being extended to position a load, for example, on the top of a tall building. Prior devices have been proposed for maintaining the load level in a transverse direction, but these devices have not provided entirely satisfactory. For one thing, numerous controls must be attended to by the operator, and it has been difficult and sometimes dangerous to additionally burden the operator with the responsibility to level the load in all directions. Furthermore, these prior art devices were not only inconvenient for the operator to manipulate and were not fool-proof in operation, but they also were unsatisfactory from a standpoint of rapid cycling time. Furthermore, some prior art systems were of the mechanical type and the operator would sometimes fail to level the load, or make an incorrect adjustment while located on unlevel ground and while raising the boom, causing the vehicle to over-turn.

Ground Engaging Means

The vehicle of the present invention has ground engaging means which can be vertically positioned relative to the vehicle body to thereby maintain the body in a transversely level position regardless of the undulation of the terrain over which the vehicle travels. As shown in the drawings, this ground engaging means includes a transversely extending generally U-shaped front axle assembly FA to which the front ground wheels W1 are attached at either end. The U-shaped axle assembly provides high ground clearance for those members extending across the width of the vehicle. The front axle assembly is pivoted intermediate its length on the longitudinal pivot axis 20, the axis 20 being supported by a pair of transversely extending and spaced apart plates 21 and 22 which in turn are rigidly fastened, as by welding, for example, to the longitudinally extending side frame members 25 and 26 of the vehicle body.

The pair of rear wheels W2 are mounted on the outer ends of a generally U-shaped rear axle assembly RA which in turn is also pivotally mounted intermediate its length on the longitudinally extending axis 30 supported by the transverse plates 31 and 32, which plates in turn are rigidly secured to the frame members 25 and 26 of the body.

The axle assemblies are thereby pivotally mounted intermediate their length to a central portion of the vehicle body 1 and thereby can vertically swing from a tilted position, as shown in FIG. 5, to a transversely level position shown in FIG. 4.

Power Means

Power means are provided between at least one of the axle assemblies and the vehicle body so that when the axle angularly tilts, as when moving over uneven ground, the vehicle body 1 may be maintained in a transversely level position. Such power means have been shown as extensible units in the form of a pair of single acting fluid cylinder units such as hydraulic rams 40 and 41 which are pivoted to a common axis 42 located generally centrally in a transverse direction on the vehicle body 1. The other ends of the cylinder units 40 and 41 are connected at spaced apart locations to the axle assemblies, such as at 43 and 44, respectively. The cylinder units 40, 41 are thereby capable of maintaining the vehicle body 1 in a transversely level position regardless of the attitude taken by the axle assemblies and their ground wheels.

As shown in FIG. 6, this embodiment utilizes no fluid cylinders between the rear axle assembly RA and the vehicle body 1, but instead the rear axle and rear wheels are free to follow the contour of the ground while the vehicle body 1 is being maintained level by the cylinder units 40 and 41 connected between the front axle assembly FA and body 1.

The embodiment shown in FIG. 7 shows fluid cylinder units 50 and 51 also connected between the rear axle assembly RA and the vehicle body 1. Under some circumstances, it may be desirable to also power actuate the vehicle body 1 relative to the rear axle assembly RA. For example, power fore and aft may be necessary to obtain sufficient power for moving the vehicle body 1 relative to both the front and rear axle assemblies RA and FA when extremely heavy loads are lifted and/or carried by the vehicle V.

Automatic Level Sensing Means

An automatic leveling system, having multiple angular sensitivity ranges, is provided for maintaining the load, which is carried by the fork, level in a transverse direction. This system may be effective both while a load is being vertically positioned and the vehicle V is stationary, and while the vehicle V itself is travelling over undulating terrain. This automatic leveling system utilizes an electrical circuit (FIG. 8) including two independent level sensing means responsive to the transverse orientation of the vehicle V, one being more sensitive than the other. Each sensing means in turn actuates a solenoid operated fluid valve that controls the flow of fluid to and from the cylinder units 40, 41. In this manner, an electric, swinging type signal device is utilized which senses deviation of the vehicle body 1 from a transversely level position and then sends a corrective signal to the power means. The operation of the automatic leveling system is as follows.

The fluid cylinders located between the axle assembly, or assemblies, and the vehicle body 1 are shown as being of the single acting type and receives fluid pressure from and returns fluid to the fluid valve 65. Fluid pressure is supplied from a conventional fluid pump P, driven by the vehicle power source, and through pressure line 59. The valve 65 is shown as being of the spring centered type and can be shifted in opposite directions to admit pressure fluid to cylinder units 40 or 41 by the energization, respectively, of the electric solenoids 60 and 61. Either solenoids 60 or 61 is actuated, at one time, to thereby extend its respective fluid cylinder and when the other solenoid is not energized, its respective cylinder is dumped to sump.

The solenoids 60 and 61 are actuated by the level sensitive means shown here as two pairs of mercury switches 70 and 71 and 80 and 81. The level sensing switches 70 and 71 will be referred to as the first angular range switches, while the level sensing switches 80 and 81 will be referred to as the second angular range switches. Since the level sensitive means are responsive to the transverse orientation of the vehicle V, they can be mounted at any convenient position on the vehicle where it would be affected by transverse tilting of the vehicle, for example, on the frame near the operator's seat.

A battery 73 carried by the vehicle is the source of electrical energy for operating the solenoids via their respective level sensing switches. The more sensitive first range switches 70 and 71 are arranged to transversely level the vehicle body to within plus or minus one degree and are selectively operated by a switch 74 which can be controlled automatically or manually. For example, the switch can be closed automatically whenever the load is raised above ground level.

The second range level sensing switches 80 and 81 can be selectively turned on or turned off by the operator simply by throwing a selector means in the form of a manual switch 75, to an "on" or "off" position. If both sets of level sensing switches are off, the front axle assembly FA is held rigid with the body, for example, during transport. If, however, the second range switches are turned on during transport, they will assure that the vehicle body is level within plus or minus five degrees, or other desirable setting depending on the load being carried.

Operation

The operation of the mercury type, level sensing switches 80 and 81 is such that when the vehicle body 1 transversely tilts in one direction or the other more than a predetermined angle, the mercury closes the contacts located within that particular switch which is affected by tilting and thus causes actuation of the appropriate solenoid A or B to, in turn, extend the appropriate fluid cylinder unit 40 or 41 and thereby push the vehicle body 1 back to a level position, at which time the actuated mercury switch is again returned to its normal position. In this manner, the fluid cylinder units 40 and 41 are utilized to hold the vehicle in the vertical position under the influence of the pressure fluid in the cylinders.

The second range electric switches 80 and 81 are so arranged in the electrical circuit that they cannot nullify the effect of the first range switches 70 and 71 if the switch 74 is closed, such as when a load is being raised or lowered and, consequently, the more sensitive first range switches 70 and 71 control the transverse level of the load whenever both switches 74, 75 are closed.

Resume

By means of the present invention, a loading vehicle has been provided which can automatically maintain the load and vehicle body in a level position. This is particularly important in a loading device having a high center of gravity and in which the load is not only elevated, but is additionally extended a considerable distance from the vehicle, as for example when the operator is attempting to place a load on the top of a building. Under these circumstances he must not only elevate the load to the proper position, but he must also simultaneously move the entire vehicle toward the building. The invention assures that the entire body of the vehicle is maintained level thereby eliminating load spilling and giving the operator a sense of stability and a good feel for the load being handled. If he desires to do so, the operator may render the level sensing means inoperative, as for example, when moving in ground traversing operation without a load or he may activate either set of level sensing switches (70, 71 or 80, 81) depending upon the sensitivity desired.

Although the invention has been described with reference to a preferred embodiment, additions, not specifically described, as well as modifications, substitutions and deletions may be made without departing from the invention, as claimed.

We claim:

1. A self-propelled loading vehicle having means for vertically positioning a load with respect to the vehicle body, said means comprising an extensible boom pivotally mounted about a horizontal axis on said body, ground engaging means for supporting the vehicle body for movement over undulating terrain, power means between the ground engaging means and the vehicle body for tilting the vehicle body in a transverse direction relative to the ground engaging means and thereby maintaining the body in a substantially level transverse position regardless of the attitude of the ground engaging means in respect thereto, and automatic level sensing means for sensing deviation of the body from a transverse level position and for actuating said power means to maintain said body in a substantially level transverse position, said level sensing means including an electric circuit having an electrical power source, a fluid flow control valve, first level sensing switch means operatively responsive to a tilting of the vehicle body in a transverse direction a first predetermined amount, second level sensing switch means operatively responsive to a tilting of the vehicle body in a transverse direction a second predetermined amount, said second amount being significantly smaller than said first amount, a first system control switch for selectively completing and interrupting a circuit including said first level sensing switching means, said electric power source and said valve, a second system control switch independent of said first system control switch for selectively completing and interrupting a circuit including said second level sensing switch means, said electric power source and said valve, circuit means ensuring the operating effectiveness of said second level sensing switch means when both first and second level sensing switch means are in circuit with said electric power source and said valve.

2. The vehicle set forth in claim 1 further characterized in that said valve is an electric solenoid operated valve connected to and operative by each of said first and second level sensing switch means, and said valve is connected to said power means for actuation thereof.

3. The vehicle described in claim 2 further characterized in that said fluid cylinder means constitutes said power means.

4. The vehicle as claimed in claim 1 further characterized in that said ground engaging means comprises a transverse axle pivotally mounted intermediate its length to a transversely central portion of said body, and said power means are a pair of extensible units connected between said body and said axle at transversely spaced locations thereon.

5. The vehicle as claimed in claim 2 further characterized in that said ground engaging means comprises a transverse axle pivotally mounted intermediate its length to a transversely central portion of said body, and said power means are a pair of extensible units connected between said body and said axle at transversely spaced locations thereon.

6. The vehicle as claimed in claim 3 further characterized in that said ground engaging means comprises a transverse axle pivotally mounted intermediate its length to a transversely central portion of said body, and said power means are a pair of extensible units connected between said body and said axle at transversely spaced locations thereon.

7. A self-propelled fork lift vehicle comprising a body, means for vertically positioning a load with respect to said vehicle body, ground engaging means for supporting said vehicle body for movement over uneven surfaces, power means between said ground engaging means and said vehicle body for tilting said vehicle body in a transverse direction relative to said ground engaging means and for maintaining said body in a substantially level transverse position regardless of the attitude of said ground engaging means, and automatic level sensing means for sensing deviation of said vehicle body from a transverse level position aand for actuating said power means to maintain said body in a substantially level transverse position, said sensing means including first and second angular sensing means, said first sensing means being adapted to maintain said load and vehicle body level during stationary operation of said vehicle and said second sensing means being adapted to maintain said load and vehicle body level as said vehicle traverses uneven surfaces, one of said first and second sensing means being of a greater sensitivity than the said other sensing means to permit greater angular disorientation of said vehicle body than the said other sensing means without actuation of said power means.

8. A self-propelled high ground clearance load lifting vehicle comprising:
   a vehicle body,
   ground engaging means for supporting said vehicle body for movement over uneven surfaces, said ground engaging means comprising a pair of transversely spaced ground engaging wheels and an axle assembly interconnecting said wheels including a high ground clearance transverse axle disposed in a horizontal plane above the horizontal plane containing the rotational axis of the wheels, power means between said ground engaging means and said vehicle body for tilting said vehicle body in a transverse direction relative to said ground engaging means,
   means for positioning a load with respect to said vehicle body, including an extensible boom pivotally mounted on said vehicle body, said boom being movable in a vertical plane to position a load substantially above said vehicle body;
   automatic level sensing means responsive to deviation of said vehicle body from a transverse level position by a predetermined angle, said sensing means comprising a first sensor responsive to a vehicle transverse angular deviation of a first angle, a first control switch for actuating said first sensor, a second sensor responsive to a vehicle transverse angular deviation of a second angle, said second angle being larger than said first angle, a second control switch for actuating said second sensor, and including a valve responsive to each of said first and said second sensors, said sensing means effecting actuation of said power means to prevent said body from tilting transversely beyond said predetermined angle regardless of the transverse attitute of said ground engaging means.

9. A high ground clearance vehicle as defined in claim 8 wherein said first sensor includes a first circuit having a first control switch for automatically actuating said first sensor upon elevation of a load relative to said vehicle body.

10. A high ground clearance vehicle as defined in claim 8 wherein said power means is a pair of hydraulic rams connected at one end to said vehicle body and at the other end to said ground engaging means and wherein said valve actuates the appropriate one of said hydraulic rams to maintain the vehicle body within a transverse angular deviation of said predetermined angle.

11. A self-propelled, high ground clearance fork lift vehicle comprising:
   a. a vehicle body including a fork lift for vertically positioning a load with respect to said body;
   b. ground engaging means for supporting said vehicle for movement over uneven surfaces, said ground engaging means including longitudinally spaced apart pairs of transversely spaced front and rear wheels, a generally U-shaped axle assembly interconnecting said front wheels and interconnecting said rear wheels, each axle assembly including a pivotal, center mounted transverse axle disposed in a horizontal plane above the horizontal plane containing the rotational axis of the wheels;
   c. automatic level sensing means responsive to a predetermined angular deviation of said vehicle body in a transverse direction from a vertical plane through the longitudinal axis of the vehicle, said sensing means including a first sensor responsive to a vehicle transverse angular deviation of a first angle, a first control switch for selectively actuating said first sensor, a second sensor responsive to a vehicle transverse angular deviation of a second angle larger than said first angle, a second control switch for selectively actuating said second sensor;
   d. power means between said vehicle body and said ground engaging means for tilting said vehicle body about said longitudinal axis relative to said ground engaging means, said power means including at least one pair of hydraulic rams each being connected at one end to said vehicle body and at their other end to opposite ends of one of the front and rear axles;
   e. valve means responsive to said sensing means for actuating said power means to prevent said body from tilting transversely beyond said predetermined angle regardless of the transverse attitude of said ground engaging means; said valve means actuating the appropriate one of said hydraulic rams to maintain the vehicle body within a transverse angular deviation of said predetermined angle; said valve being responsive to each of said first and second sensors.

12. A self-propelled load lifting vehicle comprising a vehicle body, ground engaging means for supporting said vehicle body for movement over uneven surfaces, automatic level sensing means including a first sensor responsive to a vehicle body first transverse angular deviation from a vertical plane through the longitudinal axis of the vehicle and a second sensor responsive to a vehicle body second transverse angular deviation from said vertical plane, said second angular deviation being larger than said first angular deviation control means for selectively actuating and disabling said first sensor, power means between said vehicle body and said ground engaging means for tilting said vehicle body relative to said ground engaging means about said longitudinal axis, said sensing means effecting actuation of said power means to prevent said first angular deviation when said first sensor is actuated and from tilting transversely beyond said second angular deviation when said first sensor is disabled by said control means.

13. A vehicle as defined in claim 12 wherein said control means includes means for selectively actuating and disabling said second sensor.

14. A vehicle as defined in claim 12 wherein said power means includes at least one pair of hydraulic rams, one of said rams being connected at one end to said body and at its other end to the ground engaging means on one transverse side of said body, the other of said rams being connected at one end to said body and at its other end to the ground engaging means on the other transverse side of said body.

15. A vehicle as defined in claim 13 wherein said sensing means includes a valve responsive to each of said first and second sensors for effecting actuation of said power means.

16. A vehicle as defined in claim 14 wherein said sensing means includes a valve responsive to each of said first and second sensors for effecting actuation of said power means.

17. A vehicle as defined in claim 13 wherein said control means includes means for automatically actuating said first sensor when said means for vertically positioning a load is operated to elevate said load.

18. A vehicle as defined in claim 14 wherein said control means includes manual control means for actuating said second sensor.

19. A vehicle as defined in claim 18 wherein said sensing means includes one valve which is responsive to each of said first and second sensors for effecting actuation of said power means.

20. A self-propelled load lifting vehicle comprising:
a. a vehicle body;
b. means for vertically positioning a load with respect to said vehicle body;
c. ground engaging means for supporting said vehicle body for movement over uneven surfaces, said ground engaging means including a pair of transversely spaced front wheels, a pair of transversely spaced rear wheels spaced longitudinally from said front wheels, a front axle assembly interconnecting said front wheels including a pivotal, center mounted transverse front axle, a rear axle assembly interconnecting said rear wheels including a pivotal, center mounted transverse rear axle;
d. automatic level sensing means including a first sensor responsive to a vehicle body transverse angular deviation from a vertical plane through the longitudinal axis of the vehicle of a first angle and a second sensor responsive to a vehicle body transverse angular deviation from said vertical plane of a second angle, said second angle being larger than said first angle;
e. control means for selectively actuating each of said first and second sensors;
f. power means for tilting said vehicle body relative to said ground engaging means about a longitudinal axis, said power means comprising at least one pair of hydraulic rams one of which being connected at one end to said vehicle body and at its other end to one end of one of said front and rear axles, the other ram being connected at one end to said vehicle body and at its other end to the other end of said one of said front and rear axles; and
g. a valve responsive to each of said first and second sensors for actuating the appropriate one of said rams to prevent the vehicle body from tilting transversely beyond the angular deviation corresponding to the actuated sensor.

21. A vehicle as defined in claim 20 wherein said control means includes means for automatically actuating said first sensor when said means for vertically positioning a load is operated to elevate said load.

22. A vehicle as defined in claim 20 wherein said control means includes manual control means for actuating said second sensor.

* * * * *